United States Patent [19]

Komaki et al.

[11] Patent Number: 5,025,439
[45] Date of Patent: Jun. 18, 1991

[54] METHOD FOR RECORDING AND REPRODUCING OF INFORMATION ON AN OPTICAL DISK OF A PHASE-CHANGE TYPE

[75] Inventors: Toshihiro Komaki; Hideo Kudo; Tomonori Ishizuki; Shinichi Yokozeki, all of Tokorozawa, Japan

[73] Assignee: Pioneer Electronic Corporation, Tokyo, Japan

[21] Appl. No.: 236,913

[22] Filed: Aug. 26, 1988

[30] Foreign Application Priority Data

Nov. 24, 1987 [JP] Japan .............................. 62-295679

[51] Int. Cl.⁵ .............................................. G11B 7/00
[52] U.S. Cl. .................................... 369/100; 369/116
[58] Field of Search ................. 369/100, 109–110, 369/121, 122, 13, 14, 35, 116; 346/762

[56] References Cited

U.S. PATENT DOCUMENTS

| 4,383,262 | 5/1983 | Noguchi | 369/122 X |
| 4,477,852 | 10/1984 | Ota et al. | 369/100 |
| 4,710,911 | 12/1987 | Yamada et al. | 369/100 |
| 4,718,053 | 1/1988 | Sato et al. | 369/100 V |
| 4,787,077 | 11/1988 | Barton et al. | 369/100 |
| 4,839,883 | 1/1989 | Nagata et al. | 369/100 X |
| 4,855,975 | 8/1989 | Akasaka et al. | 369/13 |
| 4,888,750 | 12/1989 | Kryder et al. | 369/100 |

FOREIGN PATENT DOCUMENTS

| 58-41446 | 3/1983 | Japan | 369/109 |
| 61-88748 | 1/1986 | Japan | 369/110 |
| 61-276127 | 12/1986 | Japan | 369/100 |

OTHER PUBLICATIONS

Journal of Applied Physics; vol. 60, No. 12, Young et al., "Effects of Transition-Metals on Telerium Alloys for Reversible Optical-Data Storage"; 15 Dec. 1986, pp. 4319-4322, copy in 369/100.

Primary Examiner—Donald McElheny, Jr.
Attorney, Agent, or Firm—Fleit, Jacobson, Cohn, Price, Holman & Stern

[57] ABSTRACT

A method for recording and reproducing data on an optical disk of a phase-change type which is capable of being over-written, comprising steps of: writing the data by a writing light beam, erasing the written data by an erasing light beam, and reading the written data by a reading light beam, characterized by a step for initializing the optical disk so that a width of an initialized region is wider than the diameter of a spot written by the writing light beam on the optical disk.

4 Claims, 5 Drawing Sheets

Fig. 2AA
(PRIOR ART)
Fig. 2AB
(PRIOR ART)
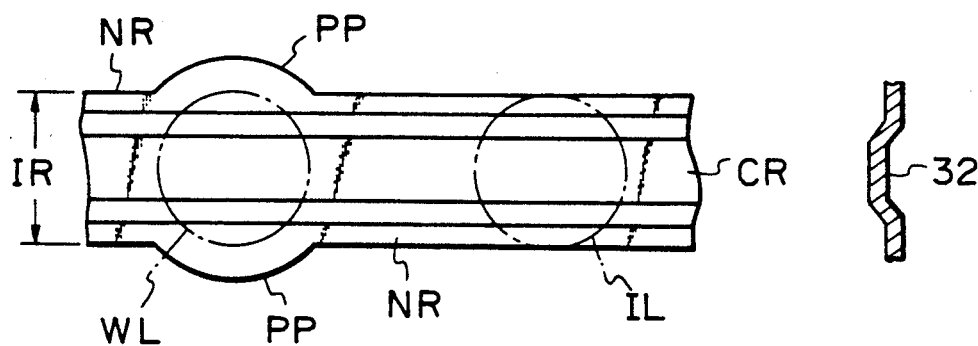
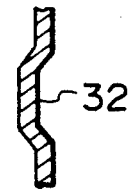
Fig. 6AA
Fig. 6AB
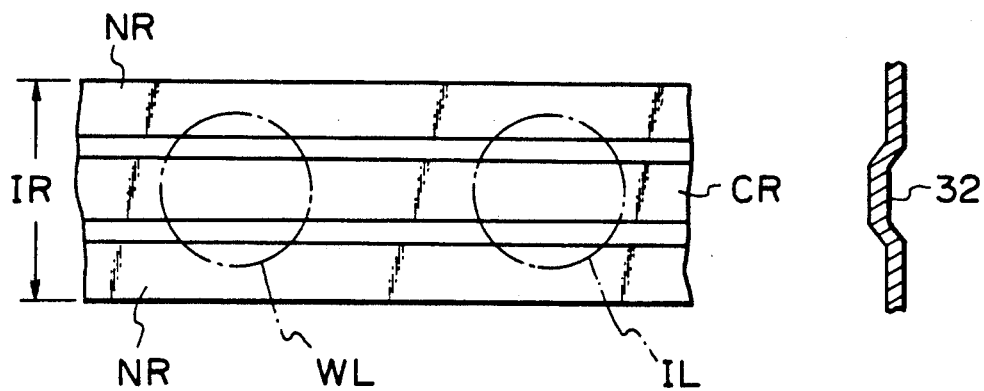
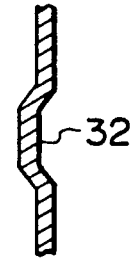

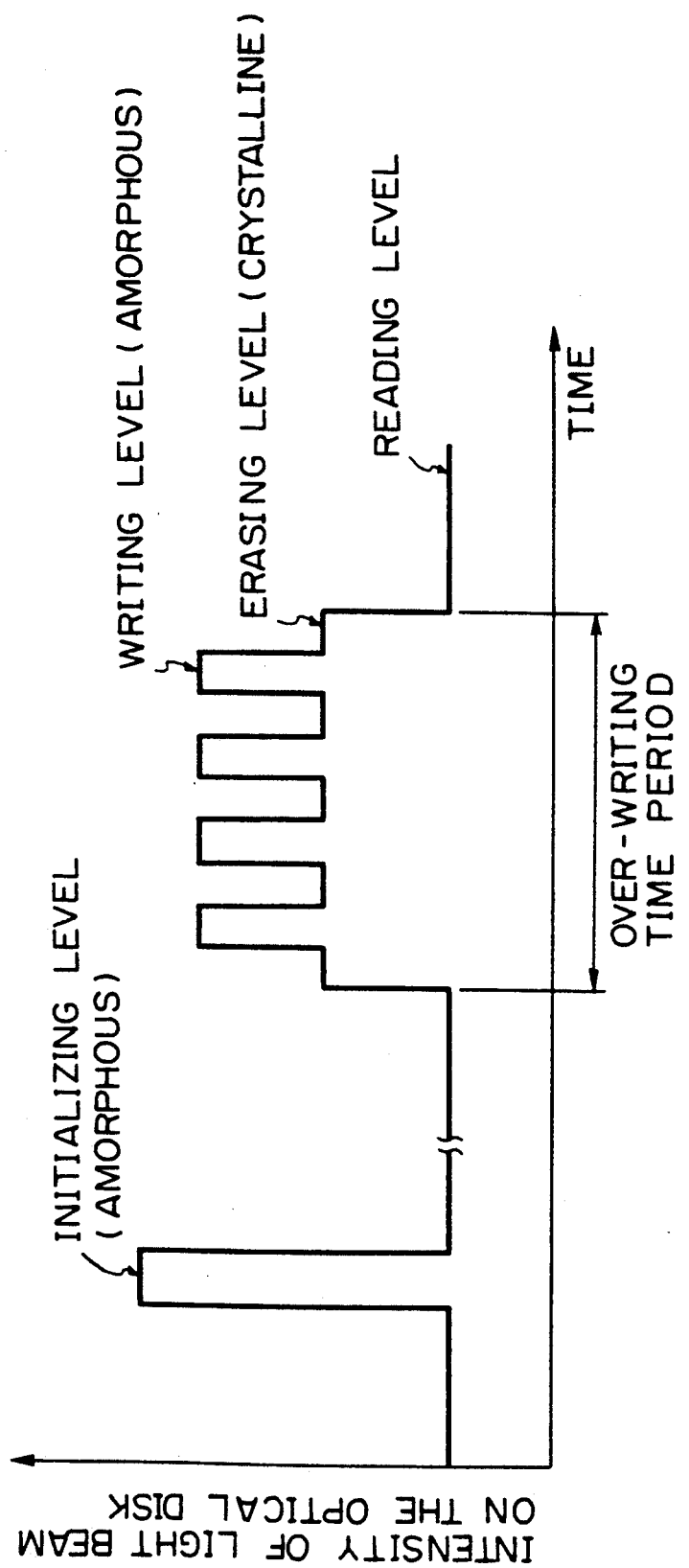

METHOD FOR RECORDING AND REPRODUCING OF INFORMATION ON AN OPTICAL DISK OF A PHASE-CHANGE TYPE

BACKGROUND OF THE INVENTION

1. Field of the Invention

The present invention relates to a method for recording and reproducing data on an optical disk of a phase-change type, particularly to the method for writing, erasing and reading data on the optical disk which is capable of being over-written.

2. Description of the Prior Art

E-DRAW (Erasable—Direct Read After Write) optical disks were recently developed, some of which are subject to practical applications. Such optical disks are classified into two types of a magneto-optical disk and an optical disk of a phase-change type. In the latter, such property of an alloy is utilized that the reflection factor thereof changes due to the phase transition thereof between phases of crystalline and amorphous. A structure of the optical disk of the phase-change type is illustrated in FIG. 1, in which a substrate disk 31 is made of acrylic or polycarbonate resin. On the surface of the substrate disk 31, a pregroove 32 is formed so as to be used for the tracking servo of a light beam. A recording film 33 is deposited on the pregroove 32 through the vacuum evaporation process or the sputtering deposition process. A protective film 34 is deposited on the recording film 33. Another protective film 34 (which is not shown) may be formed between the substrate disk 31 and the recording film 33.

In such a structure of the optical disk of the phase-change type 30, a phase condition of the recording film 33 after its deposition is a kind of an initial amorphous state. However, this initial amorphous state of the recording film is different from amorphous states which will be generated due to the phase-change thereof caused by the irradiation of the light beam thereon. When data are written in the optical disk 30, the initialization of the optical disk is performed in such a manner that an initializing light beam IL is irradiated onto the recording film 33 along with the pregroove 32 as seen from FIG. 2AA. By the irradiation of the initializing light beam IL at a high power level in the form of a spot, a portion of the recording film 33 within the spot in the pregroove 32 is heated above the melting point to take an amorphous state by quenching or rapid cooling. At the same time, the neighboring portions at both sides of the irradiation portion are crystallized because they are heated between the melting point and the crystallization transition temperature and thereafter annealed or slowly cooled down. As a result, the initialized region IR includes a central amorphous region CR on the pregroove 32 and a pair of crystallized neighboring regions NR which sandwich the central amorphous region as seen from FIG. 2AA.

The inventors of the present Application revealed through various experiments that when data are over-written on the initialized region IR by irradiating of a writing light beam WL having an intensity lower than that of the initializing light beam IL, peripheral parts PP of the crystallized neighboring regions which project from the initialized region IR remain as unerased residues on the track of the phase-change type optical disk during over-write recording, as shown in FIG. 2AA. FIG. 2B is a photograph showing such and actual state of the surface of the recording film of the optical disk as described. In other words, the initialized region IR is crystallized by an erasing light beam of a medium power level before incident of the writing light beam of a high power level. The writing light beam WL is irradiated on the initialized region IR in response to data to be over-written on the optical disk, so that the data are over-written on the crystallized region as a row of local amorphous domains of written spots (FIG. 2B). The diameters of spots of these initializing, erasing and writing light beams are usually set to be kept substantially the same each other. However, the neighboring portions of the local amorphous domains are so widely crystallized as to expand beyond from the initialized region IR as shown in FIGS. 2AA and 2B. In this way, the peripheral parts PP of the crystallized neighboring regions remain as the unerased residues. In the over-write recording process, the unerased residues adversely influence the reproducing of the data written on the optical disk so as to generate noise.

SUMMARY OF THE INVENTION

The objective of the present invention is to provide a method for recording and reproducing the data on the optical disk of the phase-change type in which the erase rate after the over-write recording of the data can be improved by widening the crystallized region in the initialized region.

A method for recording and reproducing data on an optical disk of the phase-change type which disk is capable of being over-written, according to the present invention, comprises the steps of: initializing the optical disk; writing the data by a writing light beam of a high level beam power while rotating said optical disk at a speed; erasing the written data by an erasing light beam of a medium level beam power while rotating said optical disk at a speed; and reading the written data by a reading light beam of a low level beam power while rotating said optical disk at a speed, characterized in that, in said initializing step, said optical disk is initialized by irradiating an initializing light beam on the optical disk in such a manner that a width of an initialized region is wider than the diameter of a spot on said optical disk produced by the writing light beam while rotating said optical disk at a speed.

The present invention is further characterized in that, said initializing light beam has the same diameter as said writing light beam on said optical disk, which is initialized in such a manner that an illuminated energy by the initializing light beam is larger than that of the writing light beam per a unitary area and a unitary time period.

The present invention is also characterized in that, said initializing light beam has a beam power higher than that of the writing light beam.

The present invention is further also characterized in that, the linear velocity of said optical disk during the initializing is lower than that during the writing step.

BRIEF DESCRIPTION OF THE DRAWING

FIGS. 2AA and 2AB are enlarged partial plan and sectional views of the optical disk of the phase-change type corresponding to FIG. 2B after a conventional initialization and over-writing;

FIG. 4 is a graph showing the levels of powers of an initializing light beam, a writing light beam, an erasing light beam and a reading light beam;

FIGS. 6AA and 6AB are enlarged partial plan and sectional views of the optical disk of the phase-change type corresponding to FIG. 6B after a initialization and over-writing according to the present invention.

DESCRIPTION OF THE PREFERRED EMBODIMENT

Figure 3:
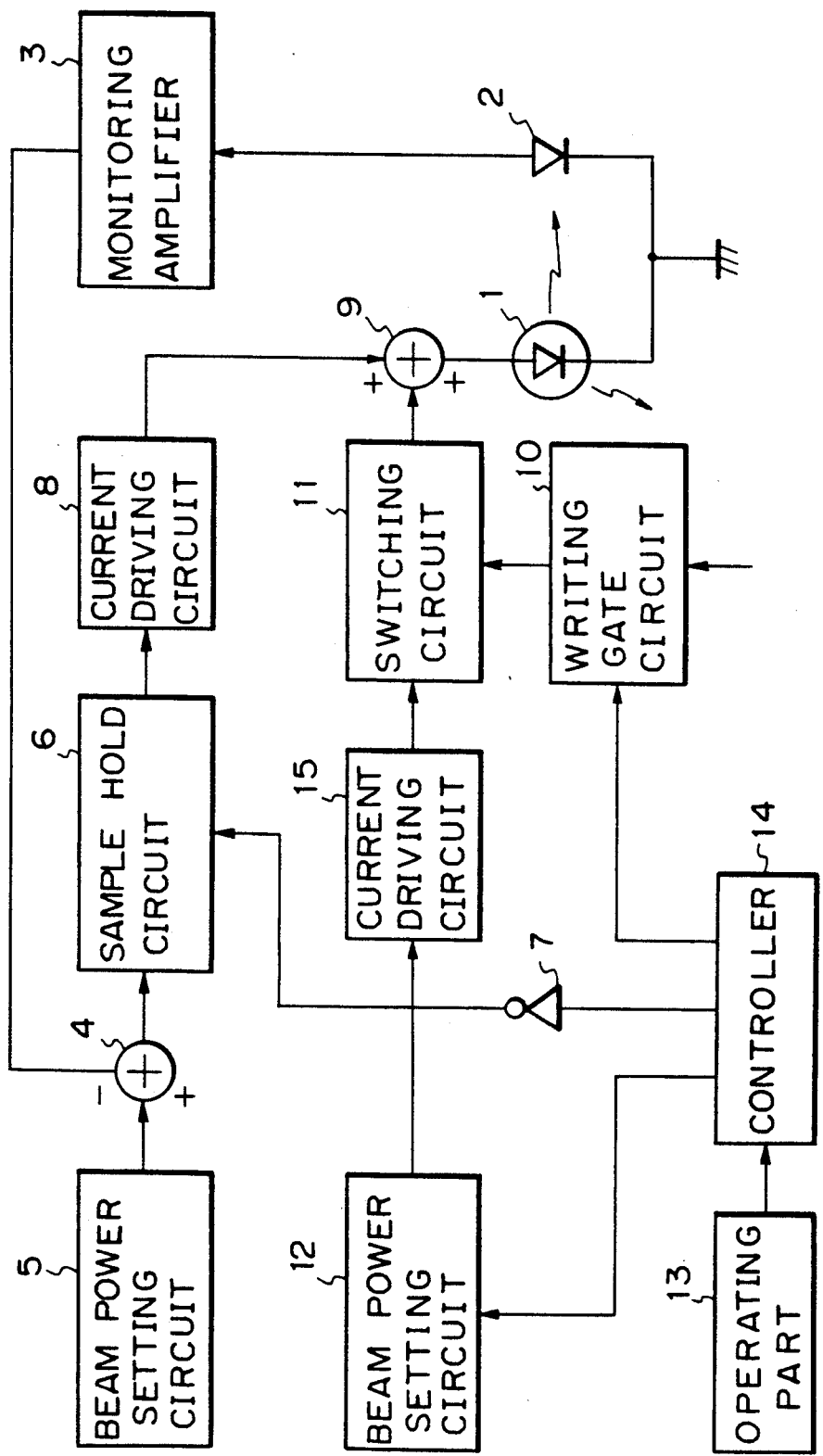
FIG. 3 is a block diagram of a structure of the recording and reproducing device for executing the method according to the present invention.

In FIG. 3, there is shown a construction of a recording and reproducing device for performing the method according to the present invention, which produces a single light beam whose intensity is changed in response to operative modes such as initializing, writing, erasing and reading.

A semiconductor laser 1 is a light source for initializing the optical disk, for writing data on the optical disk and for reading and erasing the written data therefrom. The semiconductor laser 1 incorporates a monitoring diode 2. The monitoring diode 2 receives light emitted from the backside of the semiconductor laser 1. An output of the monitoring diode 2 is supplied through a monitoring amplifier S to a subtractor 4 which subtracts the output of the monitoring diode 2 from an output of a beam power setting circuit 5. In other words, the output of the monitoring diode 2 is feedbacked so as to be compared with a value of an target beam power such as a power of the reading light beam set in the beam power setting circuit 5. In this way, the light beam power of the recording light beam is automatically controlled so as to be kept constant in a reading mode. An output of the subtractor 4 is sampled and held in a sample hold circuit 6 when a reversed gate signal generated from an inverter 7 is applied to the sample hold circuit 6. The sampled and held output of the sample hold circuit 6 is applied to a current driving circuit 8 which produces a driving current for the semiconductor laser 1 emitting a reading light beam in the reading mode.

Whereas, data to be written on the optical disk is supplied to a writing gate circuit 10 which in turn produces timing pulses to be supplied to a switching circuit 11. When the data are written on the optical disk, it is required that a writing light beam has a higher intensity than that of the reading light beam. The power of the writing light beam is set by the beam power setting circuit 12. In addition, the beam power setting circuit 12 also sets both the power of the initializing light beam which is a level for initializing the recording film of the optical disk and the power of the erasing light beam which is a level for erasing the written data on the recording film. As shown in FIG. 4, the beam power setting circuit 12 sets the power of the writing light beam to a high level or sets the power of the erasing light beam to a medium level or sets the power of the reading light beam to a low level. Particularly, the beam power setting circuit 12 sets the power of the initializing light beam to a higher level than the power of the writing light beam. A controller 14 controls the setting of levels of these beam powers in the beam power setting circuit 12 in accordance with signals of mode commands supplied from an operating part 13. When a value of the beam power is set in response to each of the mode commands, another current driving circuit 15 supplies a current of a level of the set beam power to the switching circuit 11. The current produced from the current driving circuit 15 is switched over between high and medium levels in response to the timing pulses from the writing gate circuit 10. In an adder 9, currents from the current driving circuit 8 and from the switching circuit 11 are added to each other so as to produce a driving current for the semiconductor laser 1.

Figure 1:
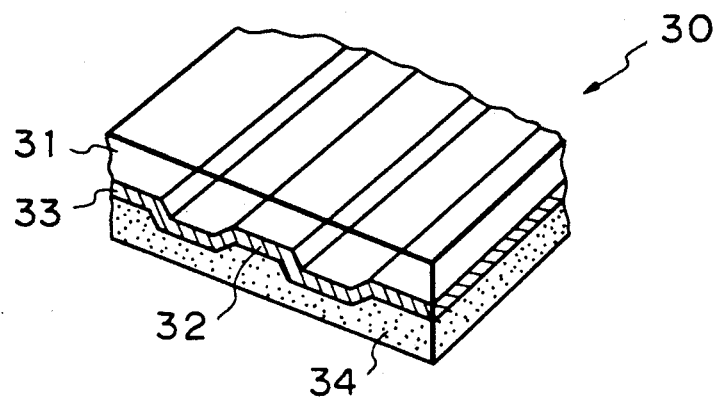
FIG. 1 is an enlarged partial perspective view of a cut portion of an optical disk of the phase-change type.
Figure 5:
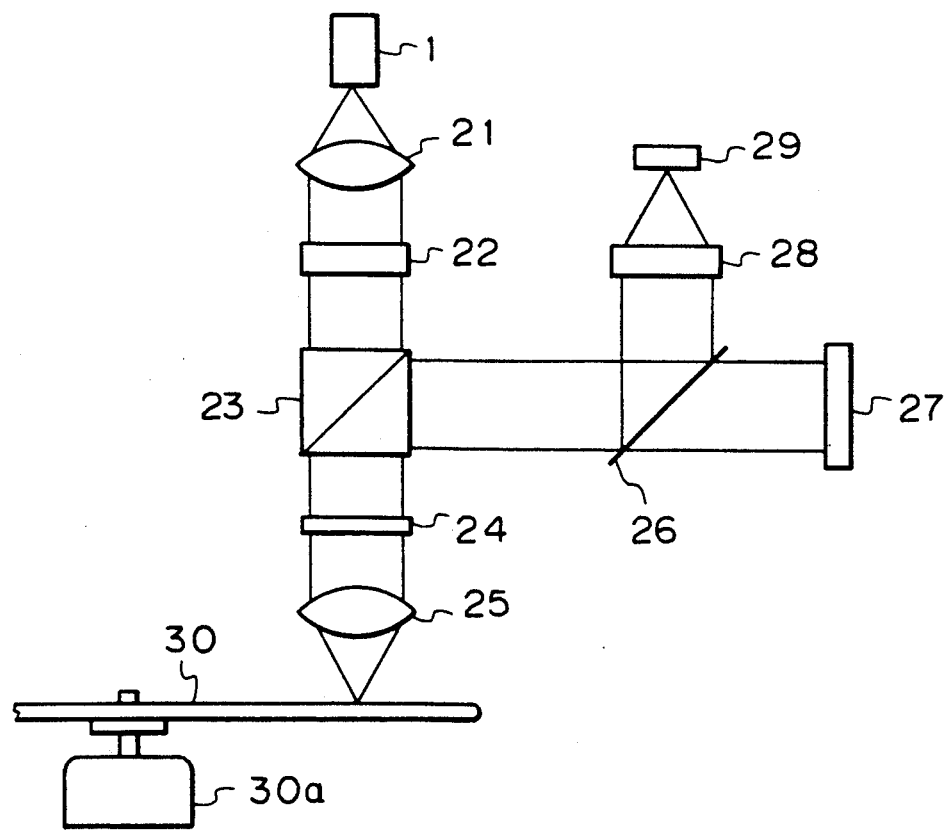
FIG. 5 is a schematic block diagram of a structure of the optical system in the recording and reproducing device for executing the method according to the present invention.

In FIG. 5, there is shown an optical system used for the present invention, for example, the optical system for illuminating a single beam spot on the optical disk per a unitary time period. A laser beam emitted from the semiconductor laser 1 is incident through a collimator lens 21 and a beam shaper prism 22 to a polarization prism 23. The light beam passing through the polarization prism 23 is incident through a λ/2 plate 24 to an objective lens 25 which focuses the light beam on an optical disk 30. Each of the focused light beams has a circular cross-section. Continuously, the light beam reflected on the optical disk 30 is incident through the objective lens 25 to the polarization prism 23 via the reverse path. A part of the light beam reflected on the polarization prism 23 passes through a half prism 26 and impinges a tracking servo detector 27. The remaining other part of the light beam is reflected on the half prism 26 and then incident through an astigmatism optical element 28 to a focusing servo detector 29 in the astigmatism form. The astigmatism optical element 28 is, for example, a cylindrical lens producing an astigmatism.

The tracking servo system using the output of the tracking servo detector 27 and the focus servo system using the output of the focusing servo detector 29 are not explained since these servo systems are well known in the technical field of the optical recording and reproducing apparatus.

To initialize the recording film 33 of the optical disk 30 is explained hereinafter.

Figure 2B:
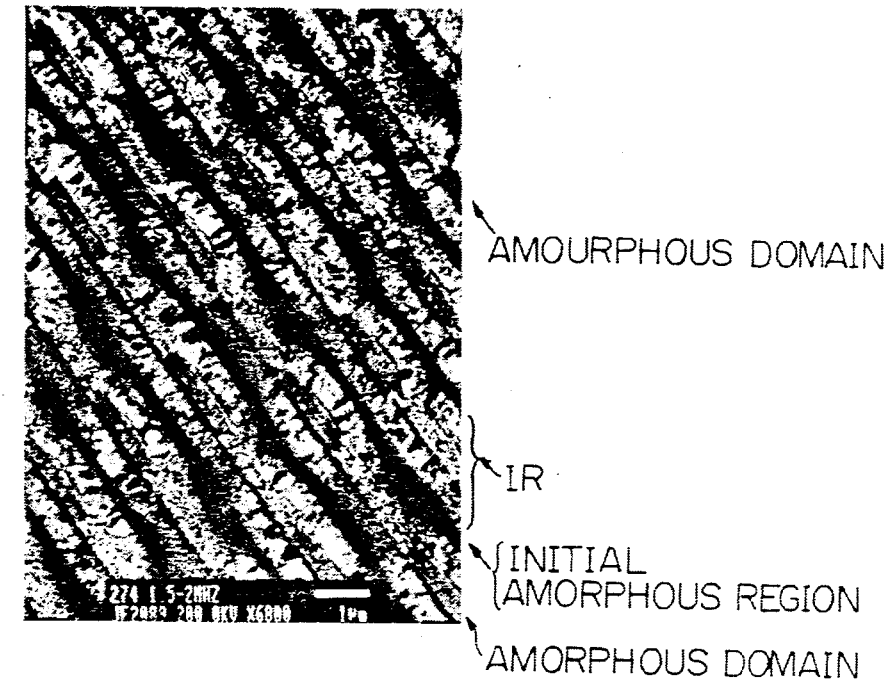
FIG. 2B is a transmission electron radiograph showing a surface of a recording film of the optical disk in which local amorphous domains are over-witten in rows by the over-writing powers 18 mW (power of the writing light beam power) and 11 mW (power of the erasing light beam) after the initialization with the initializing power 11 mW.

To compare the present invention with the prior art, the prior initialization is performed in the conditions that the power of the initializing light beam is lower than the power of the writing light beam e.g. the power of the initializing light beam is set to 11 mW and the power of the writing light beam is set to 18 mW. When the initializing light beam IL of 11 mW is irradiated along the pregroove 32 of the optical disk in the focused spot form, the central portion of the spot on the pregroove 32 is mainly heated. However, the initialized region IR is not widely formed. As shown in FIG. 2AA, the width of the initialized region IR is generally equal to the diameter of the effective writing light beam spot which is shown by the one pointed broken line of FIG. 2AA to which ½ of the maxim intensity of the light beam power is incident. Therefore, when the writing light beam WL having a high power such as 18 mW is irradiated on the pregroove 32, the central portion of the irradiated spot on the pregroove 32 is heated above the melting point to change into an amorphous state by quenching or rapid cooling. The neighboring regions at both sides of the amorphous region CR are crystallized because the neighboring regions NR are heated only up to a temperature between the melting point and the crystallization transition temperature and thereafter annealing or slowly cooling down. Therefore, peripheral portions PP of the neighboring regions NR are projected from the initialized region IR. In this way, the projecting parts PP of the crystallized neighboring potions NR remain as the unerased residues. In this conventional over-write recording process, the unerased residues adversely influence the data written on the optical disk so as to generate noise, as mentioned above.

Figure 6B:
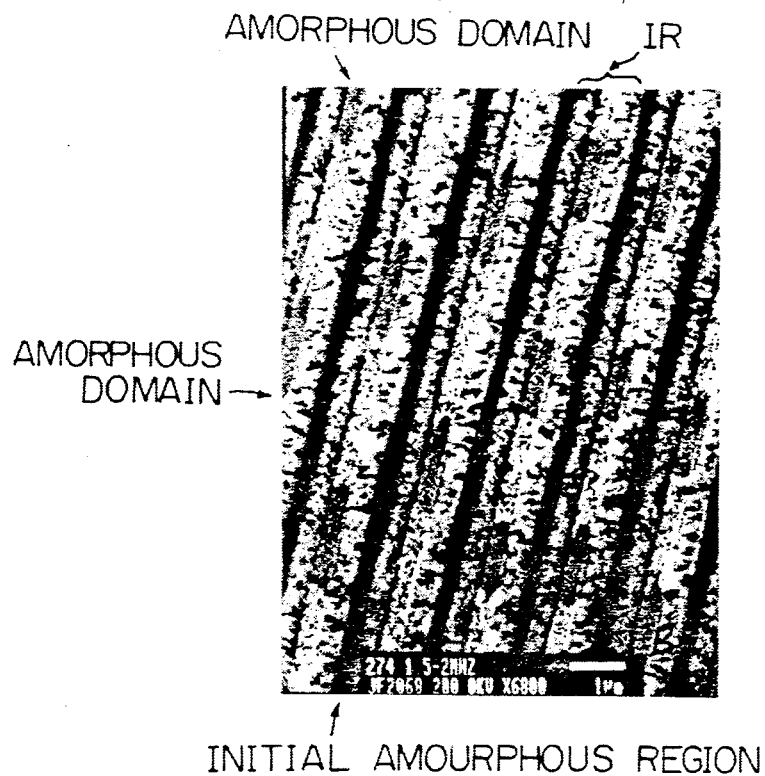
FIG. 6B is a transmission electron radiograph showing a surface of a recording film of the optical disk in which local amorphous domains are over-witten in rows by the over-writing powers 18 mW (power of the writing light beam) and 11 mW (power of the erasing light beam) after the initialization step with the initializing power 18 mW.

Whereas, an initialization according to the present invention is performed in the conditions that the power of the initializing light beam IL is equal to and higher than that of the writing light beam WL e.g. the power of the initializing light beam is set to 18 mW and also the power of the writing light beam is set to 18 mW. When the initializing light beam IL whose power is 18 mW is irradiated along a pregroove 82 of the optical disk 30 in the focused spot form, as shown in FIG. 6AA, the central portion on the spot of the pregroove 32 is mainly heated and changed into amorphous state. The neighboring portion of the spot is also heated. Then, a wide crystallized neighboring regions NR are widely formed at both sides of the amorphous region CR because it is heated between the melting point and the crystallization transition temperature by its annealing or slowly cooling down. Therefore, as shown in FIGS. 6AA and 6B, the width of the initialized region IR is larger than the diameter of spot of the effective writing light beam WL. In this way, any projected portions of the crystallized regions NR in the initialized region IR do not remain. Therefore, no unerased region remains in the over-write recording process.

As a result, it is obtained, under the condition of the over-write light beam in which the power of the writing light beam is 18 mW and the power of the erasing light beam is 11 mW, the fact that the optical disk comprising a recording film made of Sb-Te-Se-Ge of the phase-change material has the erase ratio of $-30$ dB under the power of the initializing light beam 20 mW, and furthermore has the erase ratio of $-27$ dB under the power of the initializing light beam 18 mW. Whereas, a conventional process is performed for the same optical disk under the power of the initializing light beam 11 mW. As the result, there is only obtained the erase ratio of $-20$ dB.

In the above mentioned embodiment, the recording film 33 of the optical disk is initialized by a power of the initializing light beam which is higher than that of the writing light beam.

However, the optical disk may be initialized by a low power of the initializing light beam which is lower than that of the writing light beam while being kept the wide initialized region IR. In other words, the optical disk is initialized even by the low power of the initializing light beam, while being rotated so that the linear velocity of the optical disk during initialization is lower than that upon writing the data. Therefore, the quantity of light beam energy impinged onto the spot per a unitary area during initializing is grater than that of during writing the data. In this case, wide crystallized regions of the initialized region are formed in the same manner as the case that the high power of the initializing light beam is higher than the power of the writing light beam. A recording and reproducing device for performing the second embodiment has a construction for controlling a spindle motor 30a which rotates the optical disk 30 in synchronism with the initializing mode while producing a single light beam whose intensity is changed in response to operative modes such as initializing, writing, erasing and reading.

This second embodiment lightens a burden of the semiconductor laser and the servo control system while keeping the width of the initialized region of the optical disk at a desired level.

In the method for recording and reproducing the data on an optical disk of the phase-change type according to the present invention, therefore, the optical disk is initialized in such a manner that an illuminated energy of the initializing light beam is larger than that upon writing the data per a unitary area and a unitary time period, so that the width of the initialized region IR becomes wider than the diameter of the local amorphous spot formed by the writing light beam in the optical disk.

In another embodiment, the local amorphous spots corresponding to the data may be written on the projecting land portion in stead of the pregroove 32 of the optical disk.

As explained above, the method for recording and reproducing the data on the optical disk according to the present invention includes an initialization step in which the optical disk is initialized by means of the higher power of the initializing light beam than the power of the writing light beam, or another initialization step in which the optical disk is initialized while being rotated so that the linear velocity of the optical disk is lower than that upon writing the data. Therefore, the wider initialized region is so widely formed that the erase rate is improved in the over-write recording mode.

A device for executing the method according to the present invention is simplified because the power of the initializing light beam is obtained only by means of controlling the driving currents for the semiconductor laser. The initialization and the over-writing of the optical disk are performed by only a single optical system. The manufacturing cost of the device therefore decreases.

What is claimed is:

1. A method for recording and reproducing data on an optical disk of a phase-change type which disk is capable of being over-written while rotating at a speed and being irradiated by a focused light beam as a spot on the disk, which comprises the steps of:

initializing an optical disk through the whole by irradiating an initializing spot to make, in advance of writing, an initialized region on which data is to be written and read;

writing the data in said initialized region by irradiating a writing spot;

over-writing the data by irradiating the writing spot after erasing the written data by irradiating an erasing spot; and reading the written data by irradiating a reading spot;

wherein an amount of optical energy supplied to a unitary area of said optical disk by said initializing spot is larger than that by said writing spot so that a width of said initialized region is wider than that of an area produced by the irradiation of said writing spot.

2. A method as set forth in claim 1, in which said initializing spot has the same diameter as said writing spot on said optical disk, and has an illuminance larger than that of the writing spot while the rotating speed of said optical disk is the same at both said initializing and writing steps, thereby producing a wider crystallized region in the initializing step.

3. A method as set forth in claim 1, in which both said initializing and writing spots have a circular cross-section.

4. A method as set forth in claim 1, in which said initializing spot has the same diameter as said writing spot on said optical disk, said optical disk is rotated in such a manner that the rotation speed of said optical disk during the initializing step is lower than that during the writing step, thereby producing a wider crystallized region in the initialized region.

* * * * *